(12) United States Patent
Nishihara

(10) Patent No.: US 7,107,649 B2
(45) Date of Patent: Sep. 19, 2006

(54) HINGE DEVICE

(75) Inventor: Taichi Nishihara, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 0 days.

(21) Appl. No.: 11/211,903

(22) Filed: Aug. 25, 2005

(65) Prior Publication Data

US 2005/0278896 A1  Dec. 22, 2005

Related U.S. Application Data

(62) Division of application No. 10/746,580, filed on Dec. 24, 2003, now Pat. No. 7,055,217.

(30) Foreign Application Priority Data

Dec. 26, 2002  (JP) ............................ 2002-375954

(51) Int. Cl.
*E05D 11/08* (2006.01)
(52) U.S. Cl. ........................... 16/341; 16/330; 16/337; 16/303
(58) Field of Classification Search ................ 16/341, 16/342, 337, 330, 303, 53, 50, 54; 361/680–683; 379/433.11, 433.13; 4/236, 240–241, 248; 348/373, 333.06; 455/90.3, 575.1
See application file for complete search history.

(56) References Cited

U.S. PATENT DOCUMENTS 5,109,571 A * 5/1992 Ohshima et al. ............... 16/307
5,970,819 A * 10/1999 Katoh ........................ 74/531
5,996,132 A * 12/1999 Sorimachi .................... 4/236
6,070,298 A * 6/2000 Sorimachi ................... 16/330
6,389,611 B1 * 5/2002 Fujita ......................... 4/236

FOREIGN PATENT DOCUMENTS

| JP | 10306645 A | * | 11/1998 |
| JP | 11108048 A | * | 4/1999 |
| JP | 2002310129 A | * | 10/2002 |
| JP | 2002364629 A | * | 12/2002 |
| JP | 2004183821 A | * | 7/2004 |
| JP | 2004204978 A | * | 7/2004 |

* cited by examiner

*Primary Examiner*—Chuck Y. Mah
(74) *Attorney, Agent, or Firm*—Notaro & Michalos PC

(57) ABSTRACT

A hinge device of a portable terminal connects a keyboard member to a comparatively massive display member and has cam and friction mechanisms. The cam mechanism has a fixing cam for axially receiving a shaft which extends into a cam case having a rotation arresting mechanism fixed on the shaft, a slider cam provided slidably in a manner to confront the fixing cam restrained in its rotation by the cam case, and an elastic mechanism for pressing the slider cam toward the fixing cam. The friction mechanism has a friction ring attached to the shaft and fitted into the friction case under pressure with a rotatable rotation arresting mechanism, so that both of automatic close lock function from a predetermined closed angle between the first and second members and a free stop function when opening and closing operation of the first and second members can be realized together without strain.

2 Claims, 37 Drawing Sheets

HINGE DEVICE

CROSS-REFERENCE TO RELATED APPLICATION

This is a divisional of application Ser. No. 10/746,580 filed Dec. 24, 2003 now U.S. Pat. No. 7,055,217 which is incorporated here by reference, and which claimed priority on Japanese Patent Application No. 2002-375954 filed Dec. 26, 2002, which claim is repeated here.

BACKGROUND OF THE INVENTION

1. Field of the Invention

The present invention relates to a hinge device used for a portable intelligence terminal structured with a first member composed of a keyboard main body and a second member composed of a display device, in particular, suitable for use in connecting the second member, which is comparatively massive at a portion of the display device, to the first member in a openable and closable manner relatively.

2. Description of the Relevant Art

Conventionally, as this kind of a hinge device, a technology disclosed in a Japanese Patent Laid-open No. 2000-337008 is well-known.

A hinge device disclosed in this laid-open patent official gazette includes: a shaft having an arresting portion at an end portion; a case body having a rotation arresting means allowing the shaft to be inserted through axially at the central portion and to be arrested at an arresting portion; a slider cam slidably arrested in a key groove provided on an open end side of the case body in the axial direction and having a cam portion at one end, and at the same time, allowing the shaft to be inserted through axially at the central portion; a fixing cam having a cam portion at an end confronting to the cam portion of the slider cam and allowing the shaft to be inserted through axially at the central portion; and a compression spring rounded around the shaft, being accommodated in the case body, and installed resiliently between the case body and the slider cam.

SUMMARY OF THE INVENTION

Since a purpose of a hinge device shown in the laid-open patent official gazette is to control an opening-and-closing operation of the display device, being the second member, to the keyboard main body, being the first member, only with a cam mechanism, there arises a disadvantage that even for a compact type portable intelligence terminal having a comparatively massive display device, being the second member, it is difficult to realize both an automatic closed lock function from a predetermined closed angle, and a free-stop function at the time of opening and closing operation with regard to the keyboard main body, being the first member, of the display device.

An object of the present invention is to provide a hinge device for a portable intelligence terminal which can realize both an automatic closed lock function from a predetermined closed angle and a free-stop function at the time of opening and closing operation at the same time with a structure as simple as possible, when an opening and closing operation of a display device, which is comparatively massive second member, is conducted with regard to a keyboard main body, being the first member.

In order to achieve the object described above, the present invention discloses a hinge device connecting a first member and a second member being opened and closed relatively, provided with a cam mechanism and a friction mechanism disposed on a shaft coaxially, wherein the cam mechanism includes a fixing cam provided by allowing a shaft to insert through axially at each central portion into a cam case side having a rotation arresting means fixed on the shaft, a slider cam provided slidably in a manner to confront to the fixing cam, being restrained its rotation by the cam case, and an elastic means to press the slider cam toward the fixing cam side; wherein the friction mechanism includes: a friction case having a rotation arresting means attached to the shaft in a manner to be rotatable, and a friction ring attached to the shaft and fitted in the friction case with pressure.

The present invention further discloses a hinge device connecting a first member and a second member being opened and closed relatively, provided with a cam mechanism and a friction mechanism disposed on a shaft coaxially; wherein the cam mechanism includes a fixing cam provided by allowing a shaft to insert through axially at each central portion into a cam case side having a rotation arresting means fixed on the shaft, a slider cam provided slidably in a manner to confront to the fixing cam, being restrained its rotation by the cam case, and an elastic means to press the slider cam toward the fixing cam side; wherein the friction mechanism includes a flange portion provided on the shaft, a bracket attached on the shaft, a friction washer, an elastic means, and a clamping nut so that friction torque is generated there between the friction washer and one side or both sides of the bracket.

At that time, the clamping nut can be replaced by caulking an end portion of the shaft.

The present invention still further disclose a hinge device connecting a first member and a second member being opened and closed relatively, having a pair of cam mechanism disposed on a shaft coaxially on the shaft, wherein each cam mechanism includes a fixing cam provided by allowing a shaft to insert through axially at each central portion into a cam case side having a rotation arresting means fixed on the shaft, a slider cam provided slidably in a manner to confront to the fixing cam, being restrained its rotation by the cam case, and an elastic means to press the slider cam toward the fixing cam side.

In any case of the invention described above, at least one portion of each cam portion provided on the fixing cam and the slider cam of each cam mechanism is formed in a plane portion so that friction torque is generated.

DESCRIPTION OF THE PREFERRED EMBODIMENTS

Figure 1:
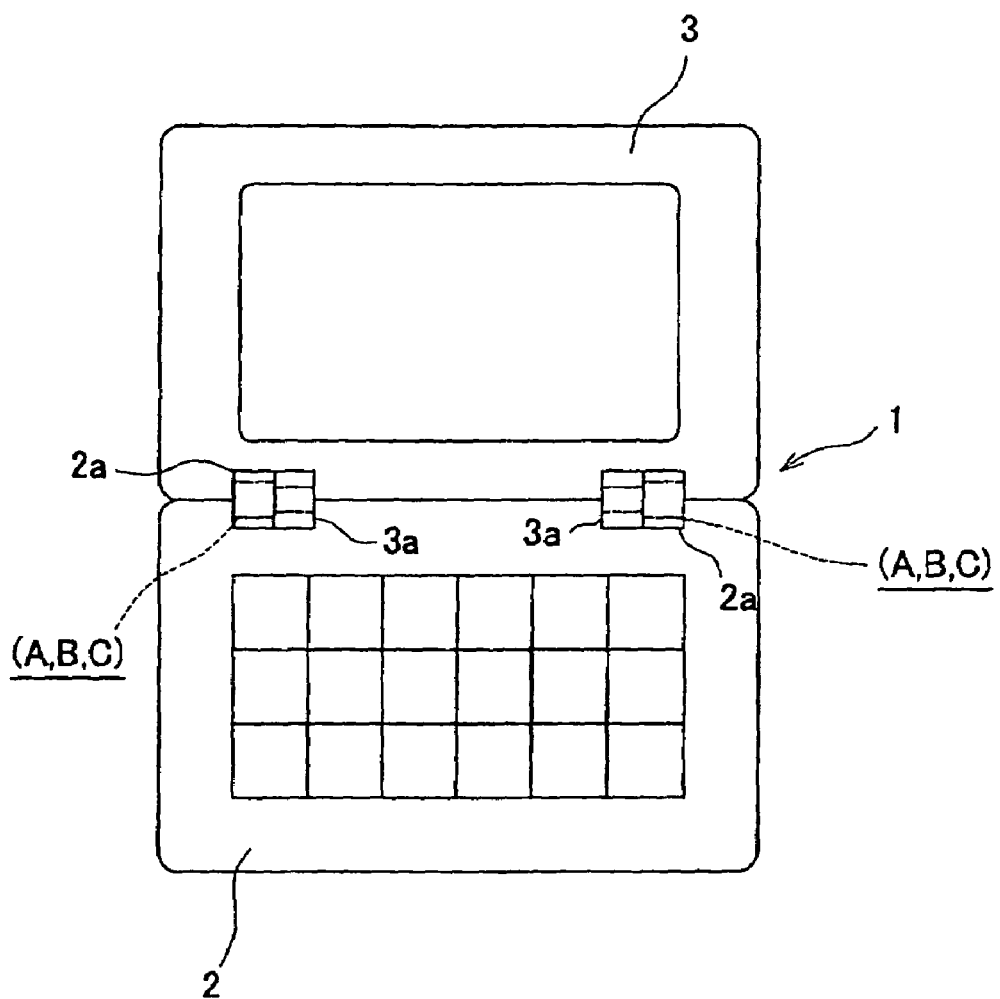
FIG. 1 is a plan view of a keyboard main body which is a first member and a display device which is a second member of a portable intelligence terminal using a hinge device relating to the present invention, both being seen in a open state.

Drawings show an embodiment of the present invention. In FIG. 1, the one shown with a reference number 1 denotes, for instance, a portable intelligence terminal, and the one shown with a reference number 2 denotes a keyboard main body forming a first member. The one shown in a reference number 3 denotes a display device composed of, for instance, a liquid crystal display device which forms a second member.

The hinge devices A and A relating to the present invention are used for connecting the keyboard main body 2, being the first member, and the display device 3, being the second member, so that the key board main device and the display device can open and close relatively to each other, and installed between attachment portions 2a and 2a of the keyboard main body 2 and attachment portions 3a and 3a of the display device. Though the hinge devices A and A are provided in a pair in this drawing, they can be in one piece. Since the hinge devices A and A are bilaterally symmetrical, and they are structured in the same way, the explanation thereof will be made hereinafter for a left hinge device A in FIG. 1.

Figure 2:
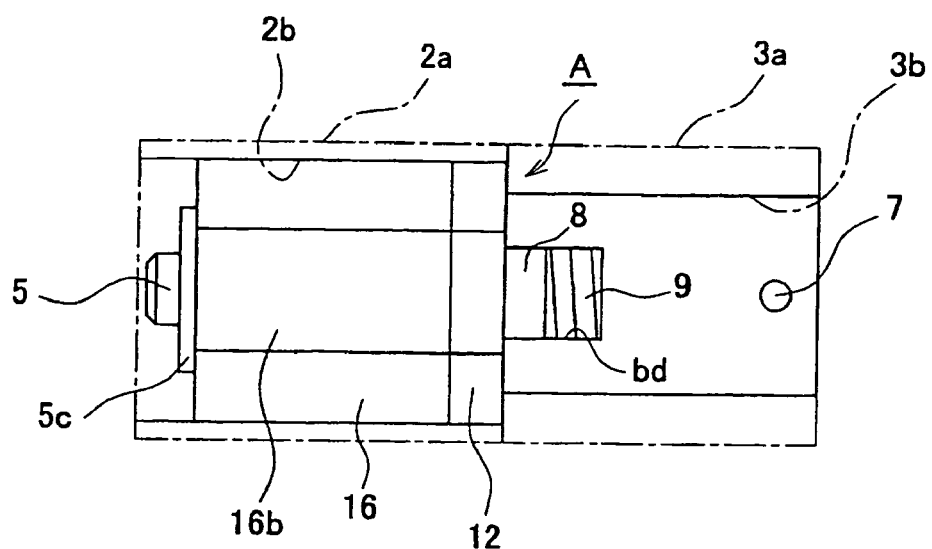
FIG. 2 is a front view of the hinge device relating to the present invention.
Figure 3:
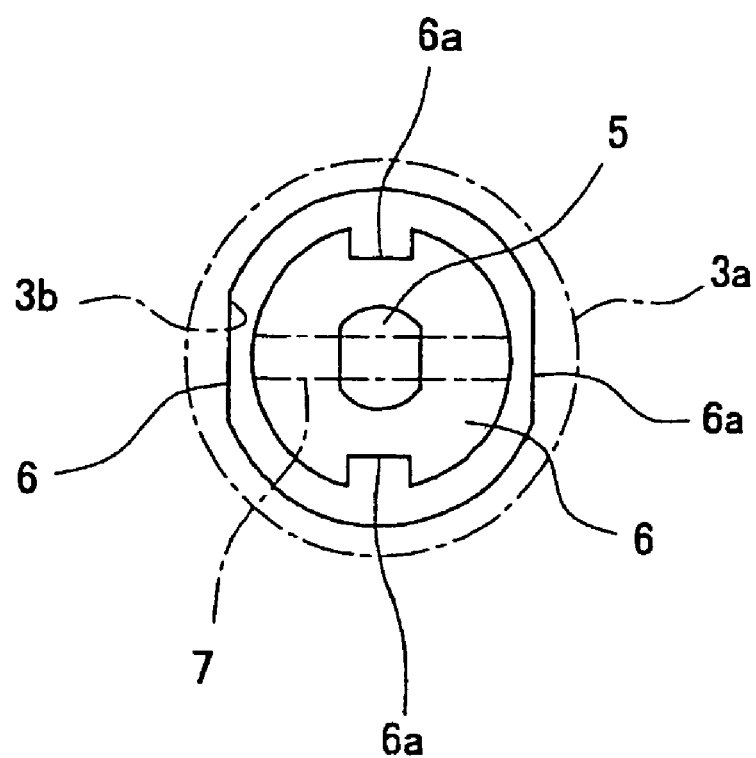
FIG. 3 is a right side view of the hinge device shown in FIG. 2.

The structure of a cam mechanism 4 affected by an elastic means is as follows. Firstly, in FIG. 2, the one shown with a reference number 5 denotes a shaft, and a reference number 6 denotes a cam case. The cam case 6 opens at one end, having rotation arresting means 6a and 6a formed of a pair of concave grooves axially on the periphery, and a deformed attachment portion 5a provided at one end of the shaft 5 is allowed to insert through into a deformed attachment hole 6c provided on the side wall 6b and engaged therewith, and fixed to the shaft 5 so as to be rotated with the shaft 5 by a fixing pin 7.

On the open end side of the cam case 6, a slider cam 8 is slidably accommodated axially, being restrained its rotation by the cam case 8, while allowing the shaft 5 to insert through into a through hole 8a provided axially at the central portion, and allowing a pair of key portions 8b and 8b provided on the outside thereof to engage with a key grooves 6d and 6d provided on the periphery of the cam case 6. An elastic means 9 composed of a compression spring wound around the shaft 5 is disposed between the slider cam 8 and the side wall 6b of the cam case 6.

A fixing cam 10 is disposed at a position confronting to the slider cam 8, allowing the shaft 5 to insert through into a through hole 10a provided axially at the central portion, the fixing cam 10 is locked at one side of a flange portion 11a of a friction ring attachment portion 11 in a friction mechanism, to be described later, which is provided on one side of the shaft 5, and is in a state that its rotation is restricted by a cam guide 12 having a rotation arresting means 12b which has a flat portion on the outside thereof. A method of arresting the rotation of the fixing cam 10 at the cam guide 12 is conducted by engaging a concave groove 10b of the fixing cam 10 inserted into a deformed attachment hole 12a with a convex portion 12c of the deformed attachment hole 12a provided on the cam guide 12, but it is not limited to this method.

On the confronting faces of the slider cam 8 and the fixing cam 10, cam portions 13 and 14 composed of convex portions 13a and 14a, and concave portions 13b and 14b whose respective upper surfaces are flat, are disposed.

A structure of a friction mechanism 15 is as follows. A reference number 16 denotes a friction case which has a side wall 16a, opens at one end, and is provided with a rotation arresting means 16b composed of a flat portion on the outer periphery. A shaft 5 is inserted axially at the central portion of the friction case 16, and rotatably supported in a through hole 16c provided on the side wall 16a. The friction case 16 is locked at the shaft 5 by the E ring 5c attached to on the other end portion of the shaft so as not to be got out. In the inside of the friction case 16, a friction torque generation hole 16d is provided concentrically with a through hole 16c, and in this friction torque generation hole 16d, three pieces of friction rings 17 made of, for instance, rubber, is press fitted to the friction ring attachment portion 11 between the flange portions 5b, 5b formed to the shaft 5. Incidentally, though not shown, between the friction ring 17 and the friction torque generation hole 16d, viscous lubricant oil, for instance, silicone oil, is applied.

Figure 4:
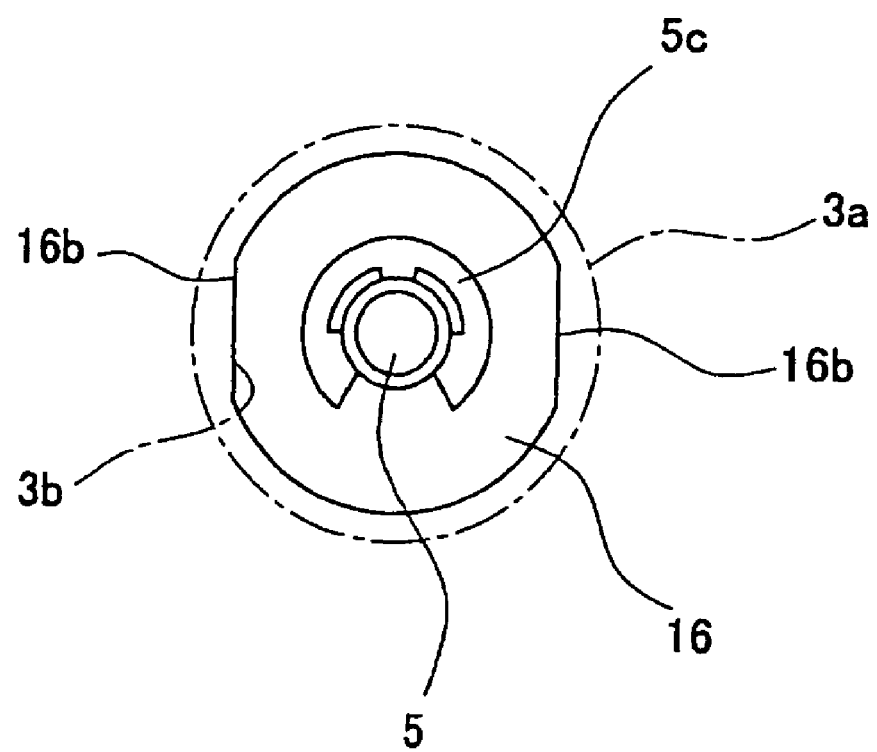
FIG. 4 is a left side view of the hinge device shown in FIG. 2.
Figure 5:
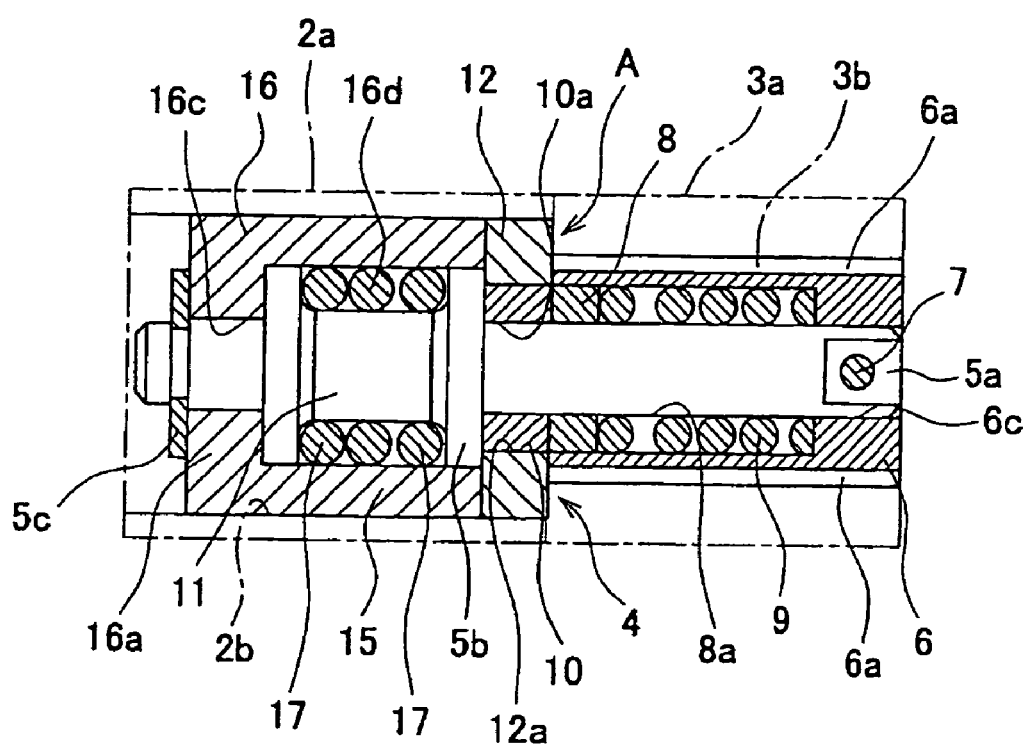
FIG. 5 is a front sectional view of the hinge device shown in FIG. 2.
Figure 6:
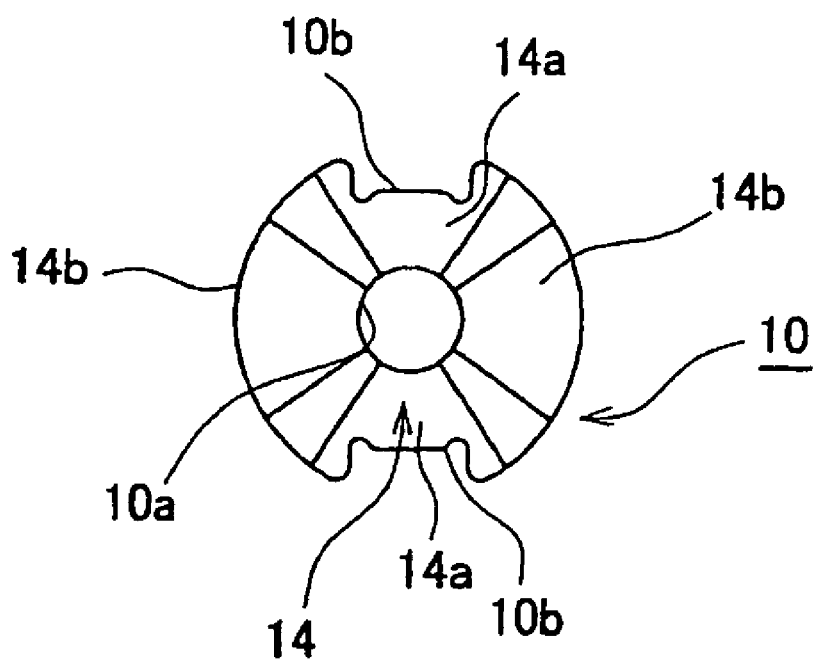
FIG. 6 is a right side view of a fixing cam of the hinge device shown in FIG. 2.
Figure 7:
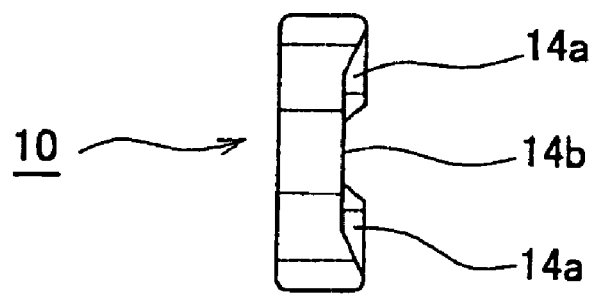
FIG. 7 is a front view of the fixing cam of the hinge device shown in FIG. 2.
Figure 8:
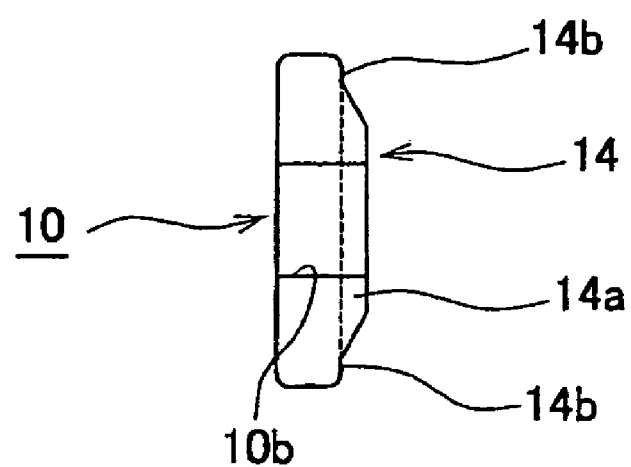
FIG. 8 is a plane view of the fixing cam of the hinge device shown in FIG. 2.
Figure 9:
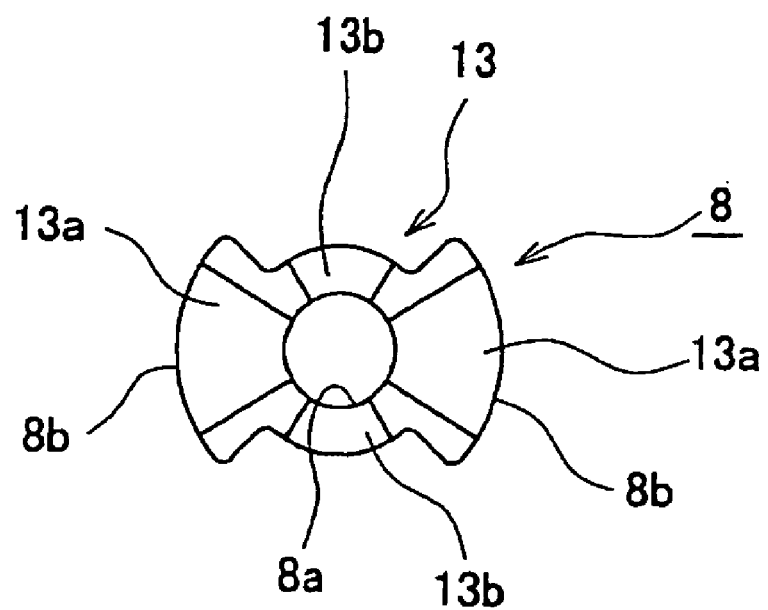
FIG. 9 is a left side view of a slider cam of the hinge device shown in FIG. 2.
Figure 10:
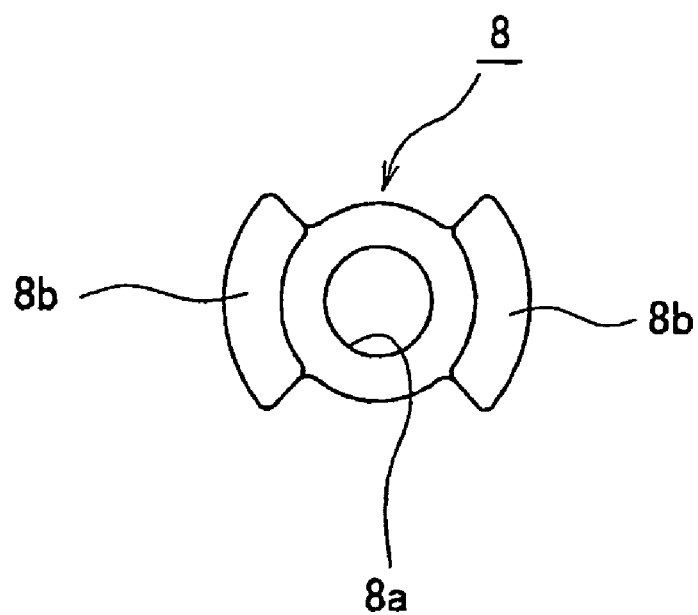
FIG. 10 is a right side view of the slider cam of the hinge device shown in FIG. 2.
Figure 11:
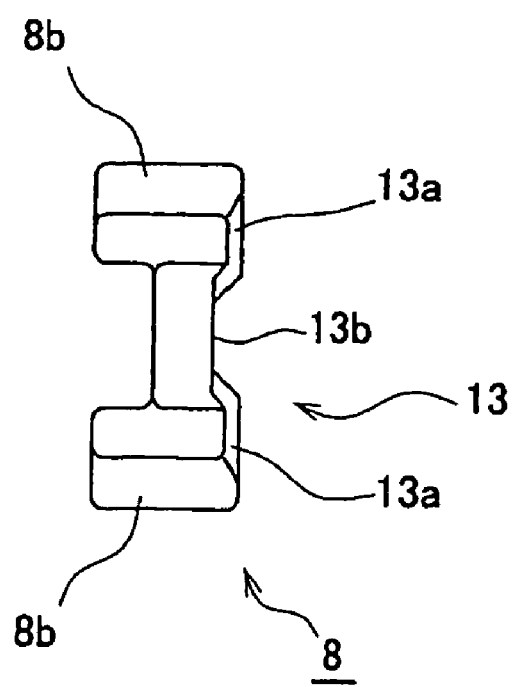
FIG. 11 is a plane view of the slider cam of the hinge device shown in FIG. 2.
Figure 12:
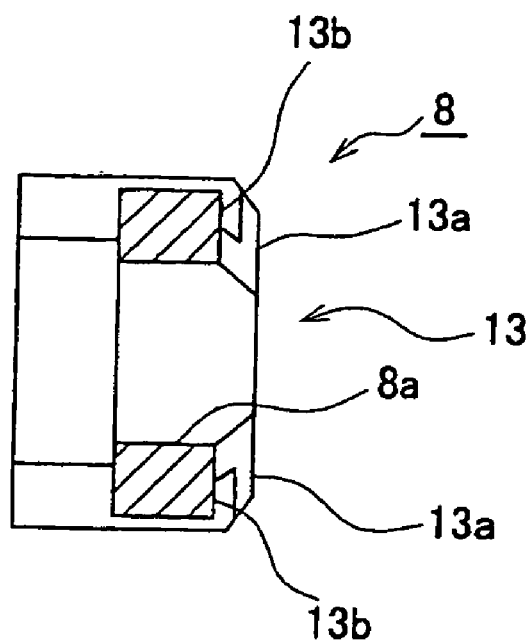
FIG. 12 is a vertical cross section of the slider cam of the hinge device shown in FIG. 2.
Figure 13:
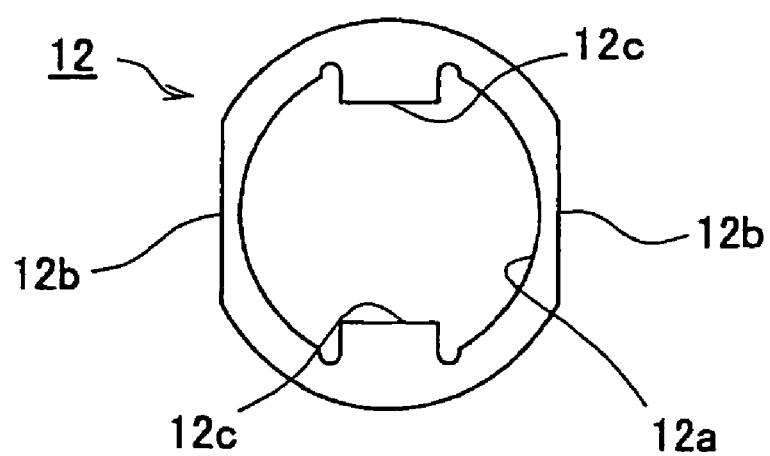
FIG. 13 is a side view of the cam guide shown in FIG. 2.
Figure 14:
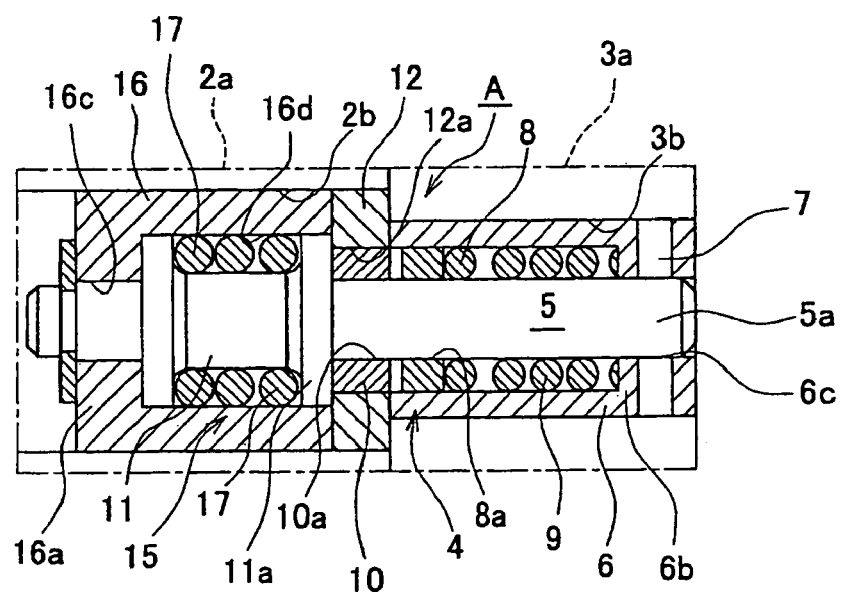
FIG. 14 is a vertical cross section to explain movement of the hinge device shown in FIG. 2 to FIG. 5.

Therefore, as shown in FIG. 1, FIG. 4, and FIG. 14, the cam case 6 of the hinge device A is allowed to insert through into and engage with the deformed attachment hole 3b provided on the attachment portion 3a of the display device 3, and the friction case 16 is inserted into and locked at the deformed attachment hole 2b provided on the attachment portion 2a of the keyboard main body 2 to complete assembling to the hinge device A.

Figure 15:
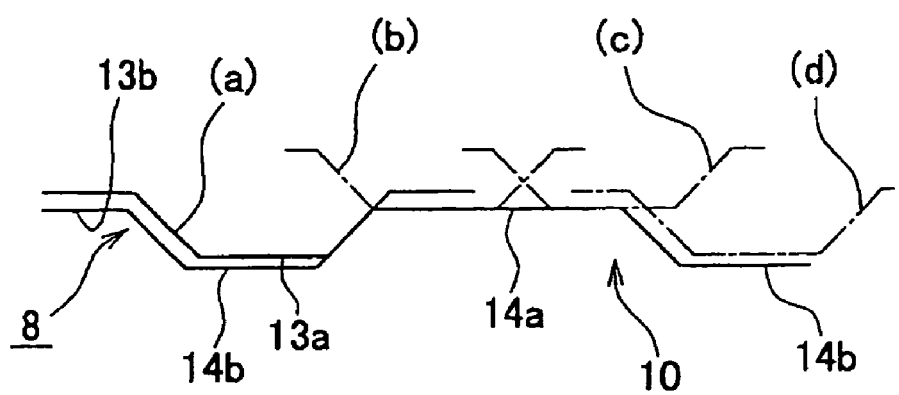
FIG. 15 is an explanatory view to explain movement of each cam portion.
Figure 16:
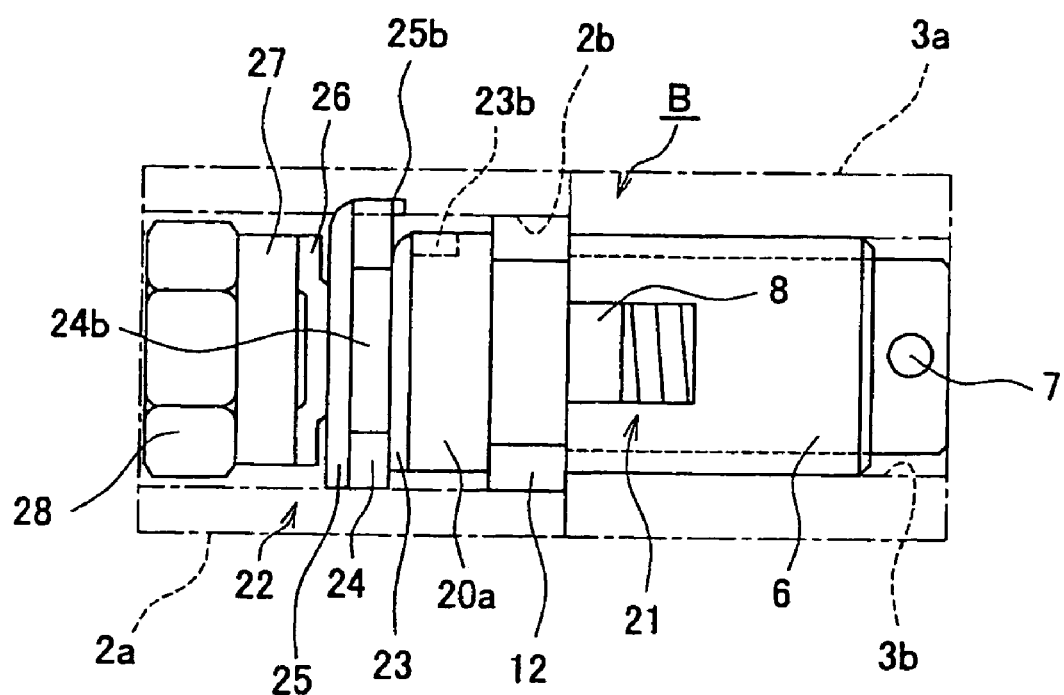
FIG. 16 is a front view showing other embodiment of the hinge device relating to the present invention.
Figure 17:
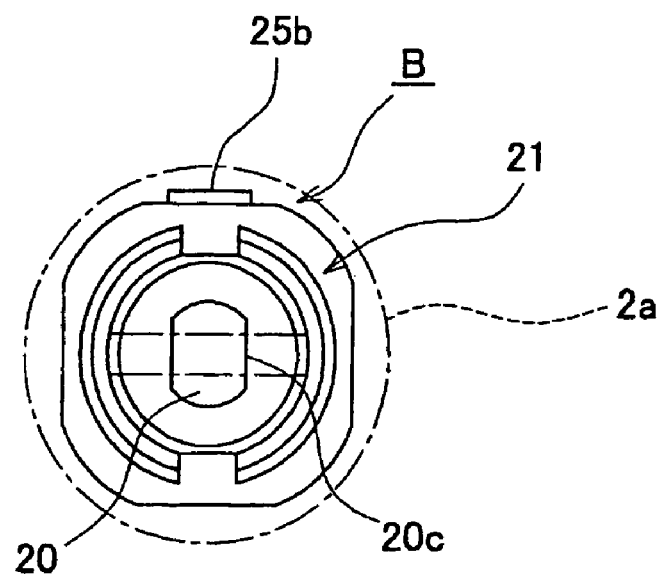
FIG. 17 is a right side view of the hinge device shown in FIG. 16.
Figure 18:
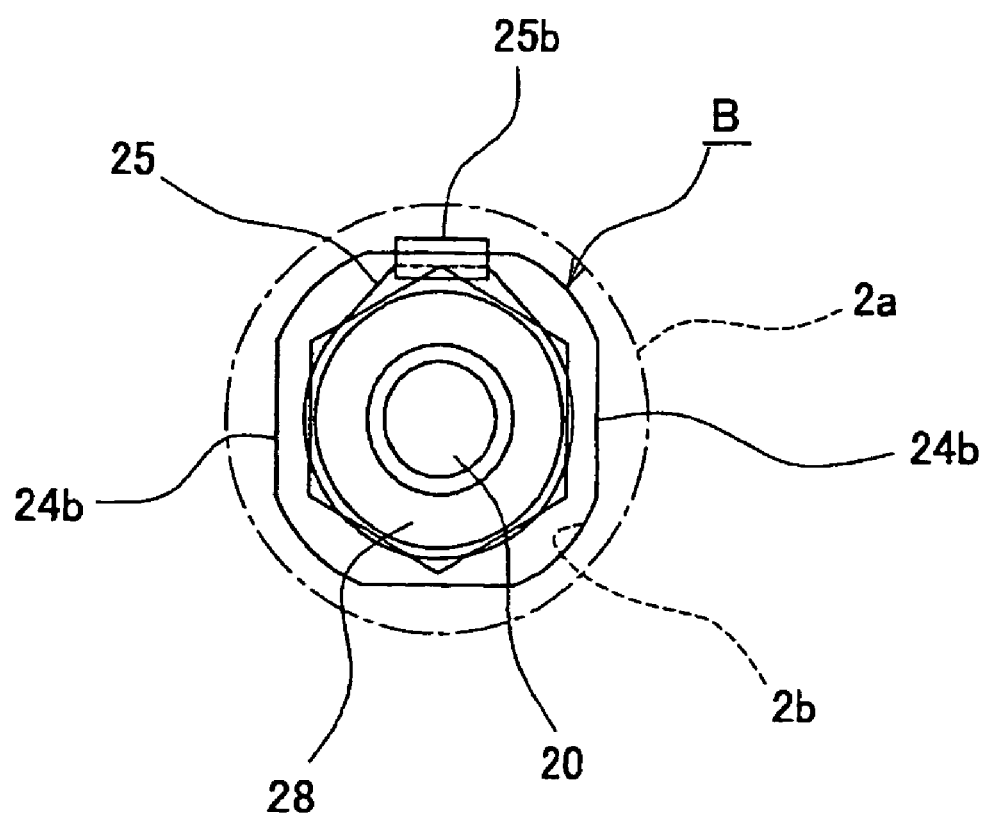
FIG. 18 is a left side view of the hinge device shown in FIG. 16.

As shown in FIG. 4, in a closed state of the display device 3, being the second member, into the keyboard main body 2, being the first member, the convex portion 13d of the cam portion 13 in the slider cam 8 is in a state of sliding down to the middle in the concave portion 14b of the cam portion 14 in the fixing cam 10, as shown in FIG. 15. When the display device 3 being the second member, is opened in relation to the keyboard main body 2 being the first member from this state, the cam case 6 rotates together with the display device 3. At first, the convex portion 13a of the cam portion 13 in the slider cam 8 rotating together with the cam case 6 meets with resistance at the time of getting out from the concave portion 14b of the cam portion 14 of the fixing cam 10 in the compression spring 9, and then, as shown with a solid line and an imaginary line in FIG; 15, the convex portions 13a and 14a of respective cam portions 13 and 14, on the surfaces of which are flat, slide on each other in a pressure contact state. Accordingly, by friction torque generated from a pressure contact force between respective convex portions 13a and 14a of these respective cam portions 13 and 14, and friction torque generated between an outer periphery of the friction ring 17 in the friction mechanism 15 and inner periphery of the friction torque generation hole 16d, the display device 3 opens in a free-stop state to the keyboard main body 2. FIG. 14 shows a state that the display device 3 is opened at 90° with regard to the keyboard main body 2. When exceeded an open angle of about 110° with regard to the key board main body 2, at which angle the display device 2 is often opened, the display device 3 is opened only with friction torque of the friction mechanism 15 by sliding down of the convex portion 13a of the cam portion 13 in the slider cam 8 into the concave portion 14b of the cam portion 14 in the fixing cam 10.

As for the case that an opened display device 3 is closed with regard to the keyboard main body 2, when the display device 3 is opened at an angle of 110° or more, the convex portion 13a of the cam portion 13 in the slider cam 8 meets with some resistance at the time of getting out from the concave portion 14b of the cam portion 14 in the fixing cam 10. However, from an angle of 110°, the display device 3 is closed with regard to the keyboard main body 2 in a free-stop state, due to a synergistic effect of friction torque generated from a state of pressure contact of respective convex portions 13a and 14a of respective cam portions 13 and 14 and friction torque of the friction mechanism 15 as shown in FIG. 15 with a solid line and an imaginary line.

From an angle of about 10° just before the display device 3 is closed, since the convex portion 13a of the cam portion 13 in the slider cam 8 slides down from the convex 14a of the cam portion 14 in the fixing cam 10 into the concave portion 14b, the display device 3 is automatically closed, and locked not to open naturally in a closed state by a suction force generated at that time.

Thus, the hinge device of this embodiment locks the display device 3 in a closed state with regard to the keyboard main body 2, can open to a usage angle in a free-stop state, and at the usage angle, while the display device is kept stably, it can be closed as if it were inhaled just before closing of the display device 3 by the cam mechanism 4. At the time of opening and closing operation of the display device 3, a soft opening and closing feeling is given to an operator by the friction mechanism, and a buffering effect at the time of closing can be realized.

FIG. 16 to FIG. 26 show another embodiment. According to the drawings, a hinge device B relating to this embodiment is shown as a left side one in FIG. 1, a cam mechanism 21 and a friction mechanism 22 are provided on the left and right of a flange portion 20a provided approximately in the central portion of a shaft 20. Since the structure of the cam mechanism 21 is the same as that in the previous embodiment, the explanation thereof will be omitted. The friction mechanism 22 is provided on the left side of the flange portion 20a of the shaft 20, and as shown in FIG. 21, FIG. 23 to FIG. 25, includes a first friction washer 23, a bracket 24, a second friction washer 25, a spring washer 26, a retaining washer 27, and a clamping nut 28 from an adjacent side of the flange portion, disposed in a manner to allow the shaft to insert through the through holes 23a, 24a, 25a, 26a and 27a provided axially at respective central portions. The first friction washer 23 is fixed to the shaft 20 by engaging an arresting piece 23b which is bent from its outer periphery with an arresting groove 20b provided on the flange portion 20a. The bracket 24 is rotatable to the shaft 20, but a rotation arresting means 24b formed of a flat portion is provided on the outer periphery thereof. The second friction washer 25 is structured to rotate with the bracket 24 by engaging an arresting piece 25b which is bent from its outer periphery with an arresting groove 24c provided on the outer periphery of the bracket 24. The spring washer 26 and the retaining washer 27 are restrained their rotation by the shaft 20 by allowing respective deformed through holes 26a and 27a to insert through and engage with a deformed portion 20c of the shaft 20. The clamping nut 28 is screwed on a male screw portion 20d of the shaft 20, so that it is structured to generate friction torque accompanied by rotational movement of the shaft 20 by pressure contact of the first friction washer 23 to one side of the bracket 24, and by pressure contact of the second friction washer 25 to the side face of the spring washer 26.

Therefore, a portion of the friction mechanism 22 is allowed to insert into the deformed attachment hole 2b provided on the attachment portion 2a of the keyboard main body, being the first member, the cam guide 12 and the bracket 24 are engaged with the deformed attachment hole 2b, and then a portion of the cam case 6 is allowed to insert and lock at the deformed attachment hole 3b provided on the attachment portion 3a of the display device 3, being the second member, thereby assembling of the hinge device B is completed.

Figure 19:
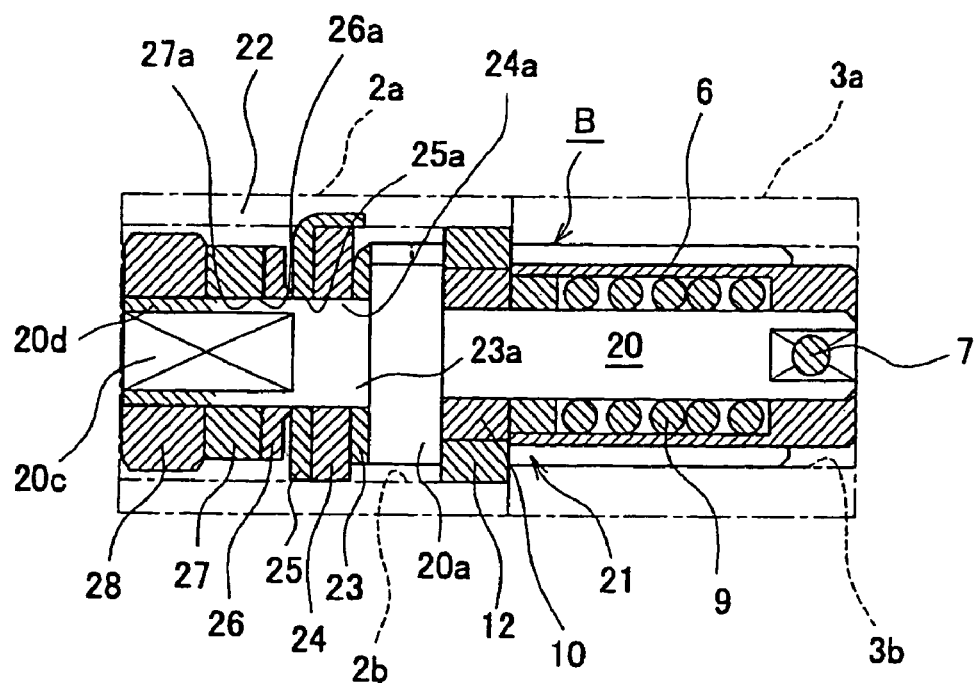
FIG. 19 is a vertical cross section of the hinge device shown in FIG. 16.
Figure 20:
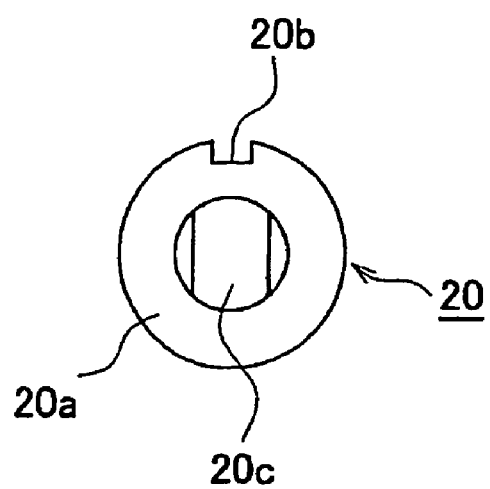
FIG. 20 is a right side view of a shaft used in the hinge device shown in FIG. 16.
Figure 21:
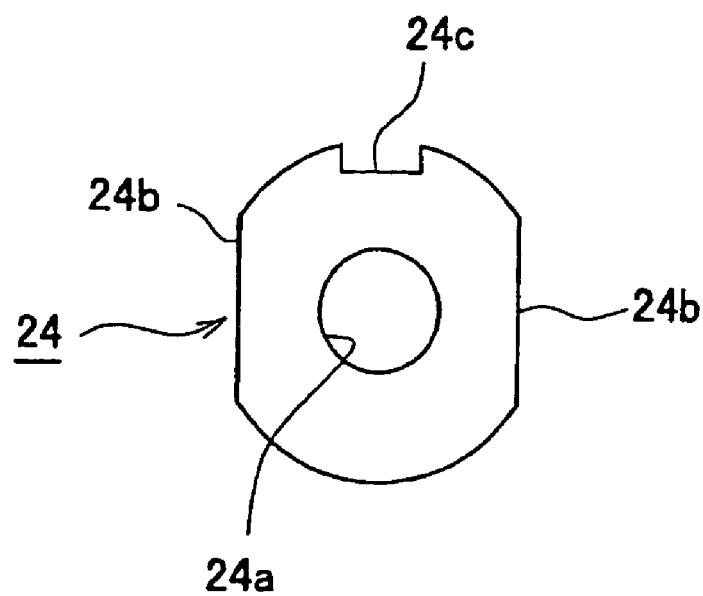
FIG. 21 is a side view of a bracket used in the hinge device shown in FIG. 16.
Figure 22:
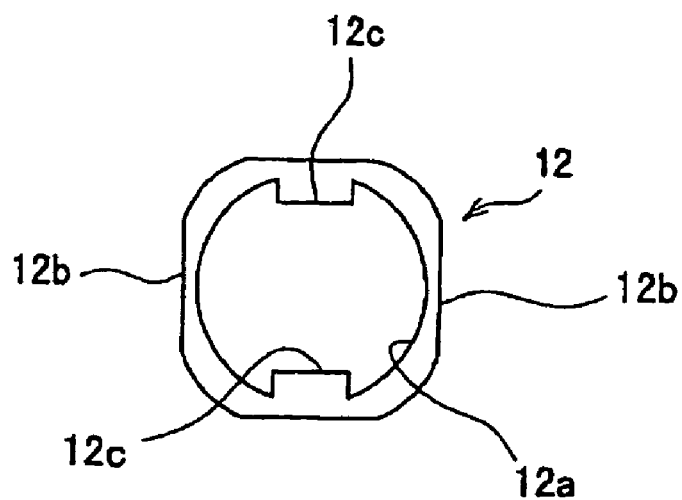
FIG. 22 is a side view of a cam guide used in the hinge device shown in FIG. 16.
Figure 23:
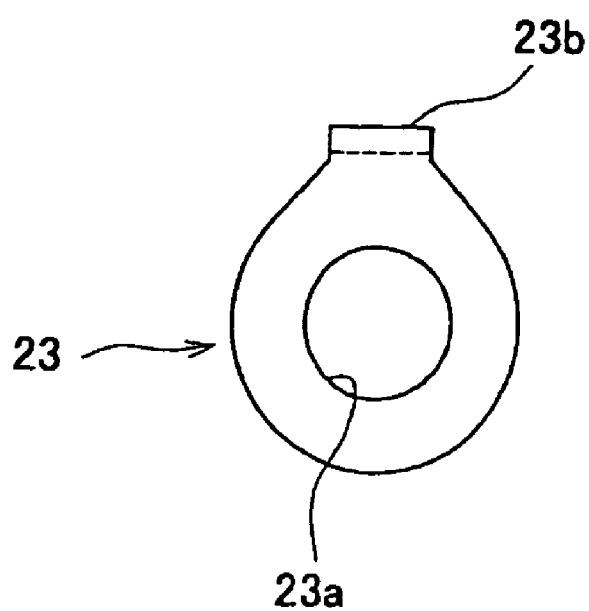
FIG. 23 is a left side view of a first friction washer used in the hinge device shown in FIG. 16.
Figure 24:
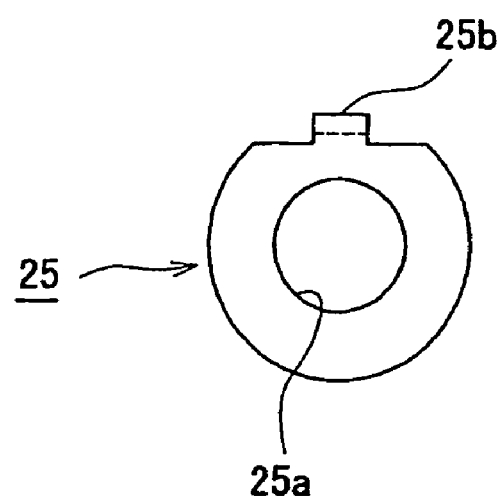
FIG. 24 is a left side view of a second friction washer used in the hinge device shown in FIG. 16.
Figure 25:
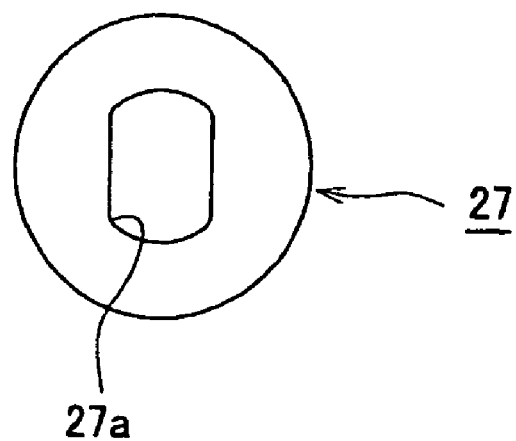
FIG. 25 is a side view of a retaining washer used in the hinge device shown in FIG. 16.
Figure 26:
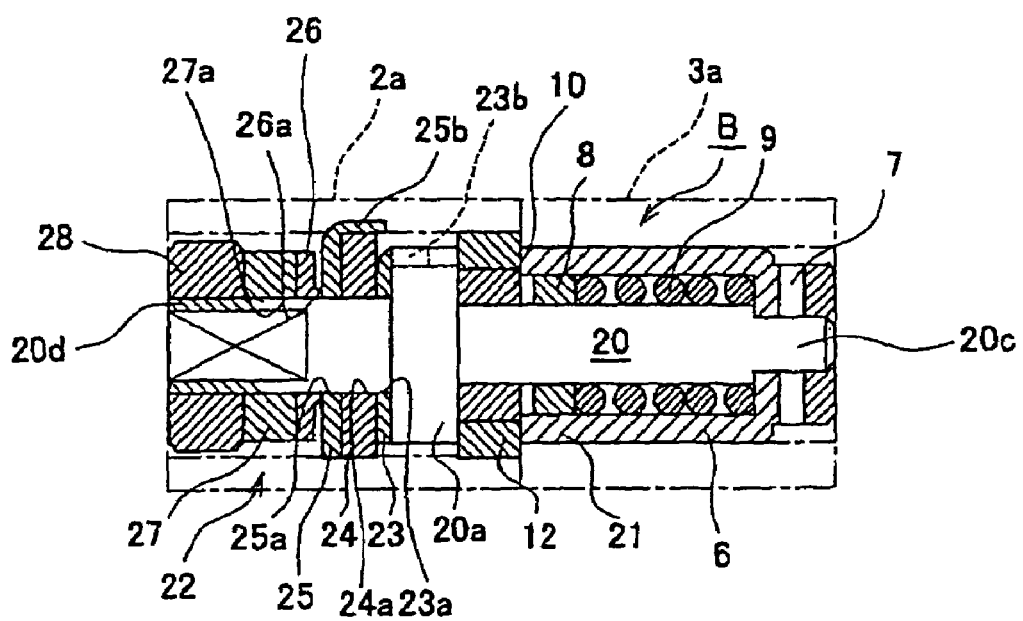
FIG. 26 is an explanatory view to explain operation of the hinge device shown in FIG. 16.

FIG. 19 shows this state in a vertical cross section. In this state, as shown in FIG. 15 with a solid line, the convex portion 13a of the cam portion 13 in the slider cam 8, inserts into the concave portion 14b of the cam portion 14 in the fixing cam 10 to lock the display device 3 not to open naturally with regard to the keyboard main body 2.

When the display device 3 opens with regard to the keyboard main body 2 from this closed state, since the cam case 6 rotates together with the shaft 20 and the slider cam 8 as shown in FIG. 15 with a solid line and an imaginary line, friction torque by sliding in pressure contact of a flat convex portion 13a of the cam portion 13 in the slider cam 8 with a flat convex portion 14a of the cam portion 14 in the fixing cam 10, and friction torque by sliding in pressure contact between the first friction torque 23 and the bracket 24, and between the second friction washer 25 and the spring washer 26, are generated, the display device 3 is suspended and kept stably, especially at an open angle of about 100° to 110°, which is the usage angle. It is of course possible to open further to 180°, and the friction torque at that time can be freely selected.

Subsequently, when the display device 3 is closed, at about 10° which is a closed position, owing to the rotary torque generated when the convex portion 13a of the cam portion 13 in the slider cam 8 fits in the concave portion 14b of the cam portion 14 in the fixing cam 10, the display device 3 is closed as if being inhaled and locked in a closed state.

It should be noted that on which face of the first friction washer or the second friction washer should the friction torque of the friction mechanism 22 be generated can be freely selected other than that in the embodiment and the clamping nut 28 can be replaced by caulking of the end portion of the shaft 20.

FIG. 27 to FIG. 37 show another embodiment of a hinge device C relating to the present invention. The hinge device C of the present embodiment is the one shown on the right in FIG. 1, and the hinge device C is provided with bilaterally symmetrical first cam mechanism 31 and a second cam mechanism 32 on both sides of the shaft, and the structure of the first cam mechanism 31 and the second cam mechanism 32 are the same as that of the cam mechanism 4 and 21 in the previous embodiment. At nearly the central portion of a shaft 30, a pair of a first fixing cam 33 and a second fixing cam 34 allow the shaft 30 to insert through into a first and second through holes 33a and 34a provided axially at the central portion so that respective side faces are allowed into contact impactedly with each other, and a first cam guide 36 and a second cam guide 37 having a first deformed attaching hole 36a and a second deformed attaching hole 37a and rotation arresting means 36b and 37b composed of a flat portion on the each outer periphery while accommodating the first fixing cam 33 and the second fixing cam 34 in the inside.

On the one of both end portions of the shaft 30, a first cam case 38 with an open end and provided with a rotation arresting means 38a having a concave groove on the periphery is arranged allowing the shaft 30 to insert through inside in the axial direction, and a deformed portion 30a provided on an end of the shaft 30 is allowed to insert into a deformed through hole 38c provided on a side wall 38b of the first cam case 38 and fixed so that the shaft 30 is arrested with a attachment pin 39 in order not to get out.

On the other end of both end portions of the shaft 30, a second cam case 40 with an open end is arranged allowing the shaft 30 to insert through inside in the axial direction similarly, and the shaft 30 is allowed to insert into a through hole 40b provided on a side wall 40a, so that the shaft 30 is arrested with a deformed flange portion 30b in order not to get out while the deformed flange portion 30b is engaged into a deformed hole 40d.

On an aperture sides in the first and second cam cases 38 and 40, a pair of first slider cam 41 and second slider cam 42 are provided confronting to the first and second fixing cam 33 and 34, allowing the shaft 30 to insert through into through holes 41a and 42a provided axially at the central portion, a first and second elastic means 43 and 44 allowing to wind around the shaft 30, composed of a compression spring are disposed between respective first and second slider cams 41 and 42, and respective side walls 38b and 40a of the first and second cam cases 38 and 40, so that the first and second slider cams 41 and 42 are always forced slidably toward respective first and second fixing cam 33 and 34 sides.

Respective first and second fixing cams 33 and 34 are provided with a pair of first and second concave grooves 33b and 34b on the outer periphery. A method of arresting the rotation of the first and second fixing cams 33 and 34 at the first and second cam guides 36 and 37 are conducted by engaging a concave grooves 33b and 34b of the first and second fixing cams 33 and 34 inserted into a deformed attachment holes 36a and 37a with a convex portion 36c and 37c of the deformed attachment hole 36a and 37a provided on the first and second cam guides 36 and 37. The first and second slider cams 41 and 42 can be slide in the axial direction of the shaft 30 by engaging respective first and second key portions 33b and 34b with a first and second key grooves 38d and 40c provided in the cam cases 38 and 40.

On confronting surfaces of respective first and second fixing cams 33, 34 and respective first and second slider cams 41 and 42, first and second cam portions 45 and 46 composed of convex portions 45a, 45a and 46a, 46a and concave portions 45b, 45b and 46b, 46b similarly to the above-described respective embodiment are provided.

Figure 27:
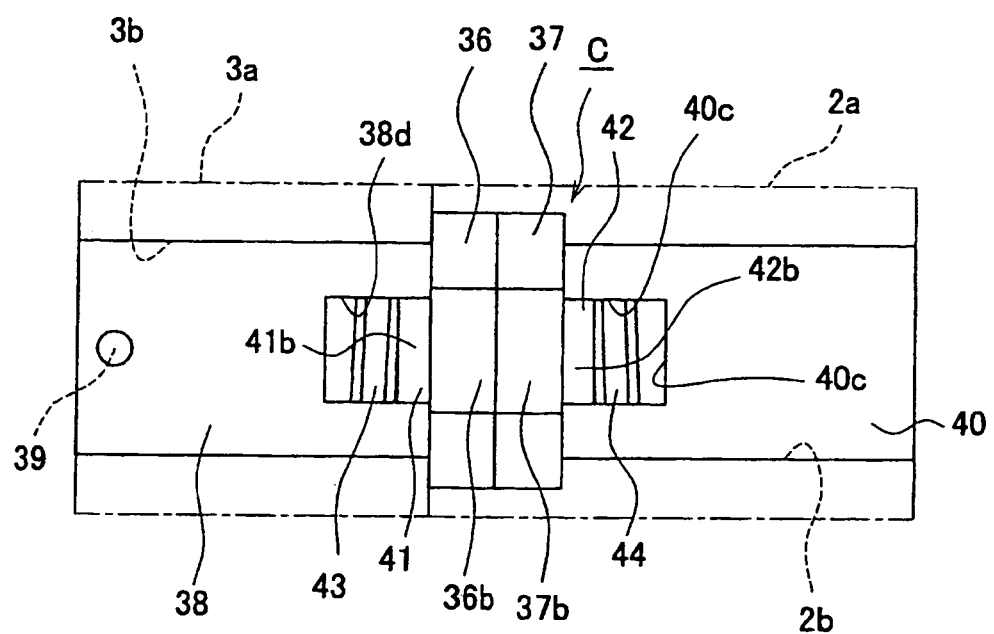
FIG. 27 is a front view showing a still another embodiment of the hinge device.
Figure 28:
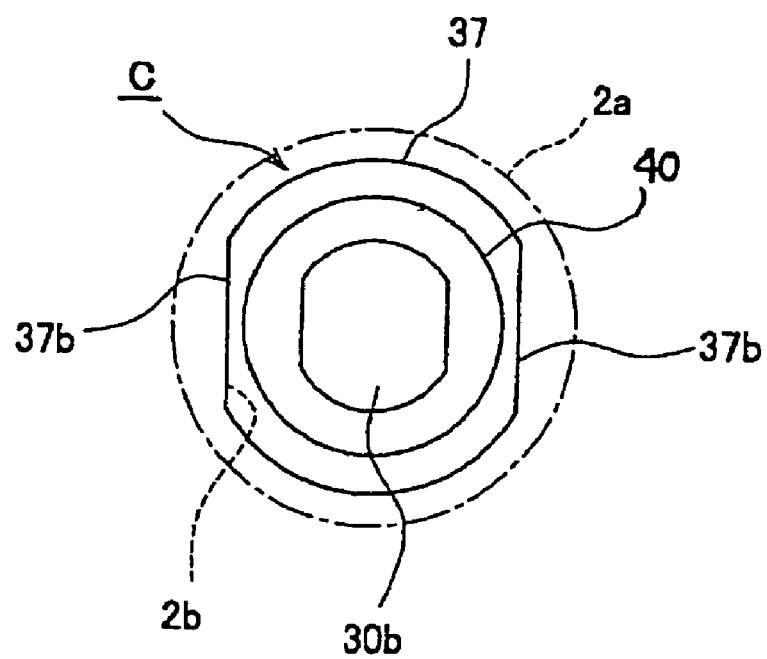
FIG. 28 is a right side view of the hinge device shown in FIG. 27.
Figure 29:
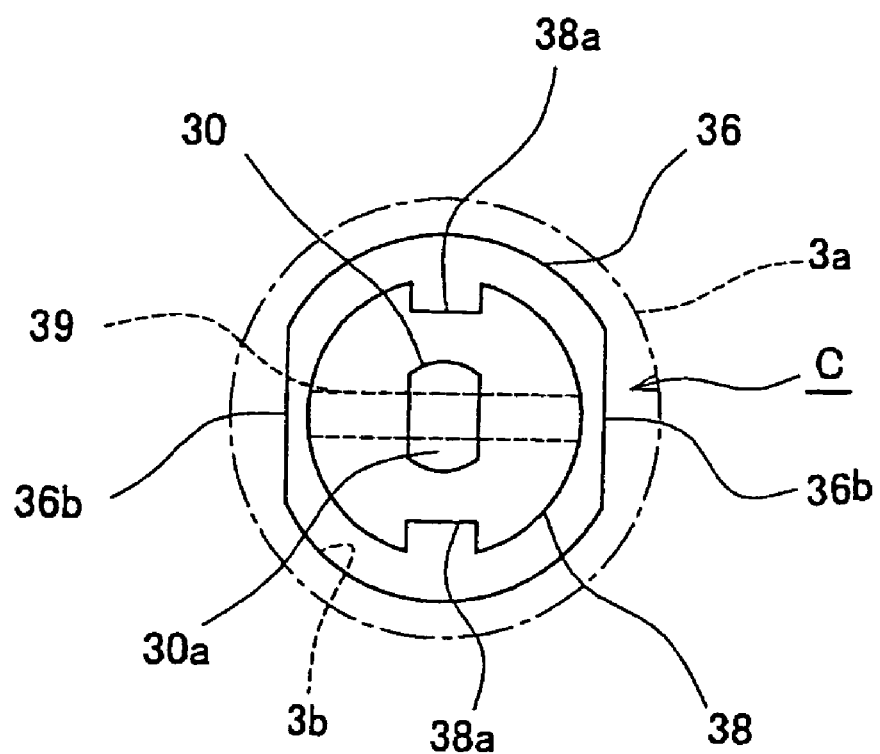
FIG. 29 is a left side view of the hinge device shown in FIG. 27.
Figure 30:
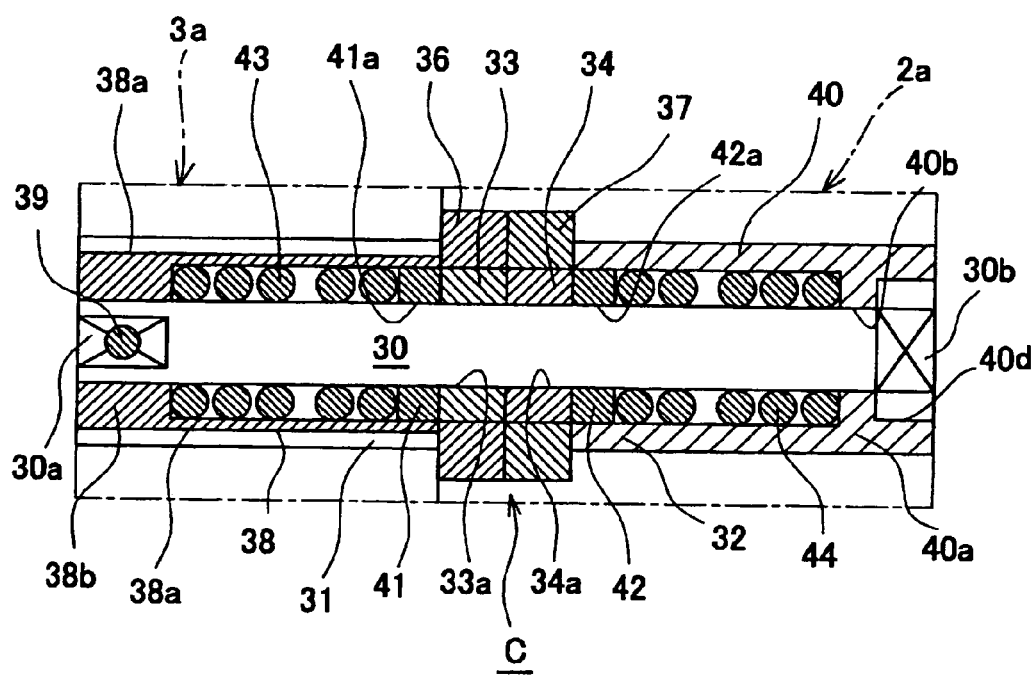
FIG. 30 is a vertical cross section of the hinge device shown in FIG. 27.
Figure 31:
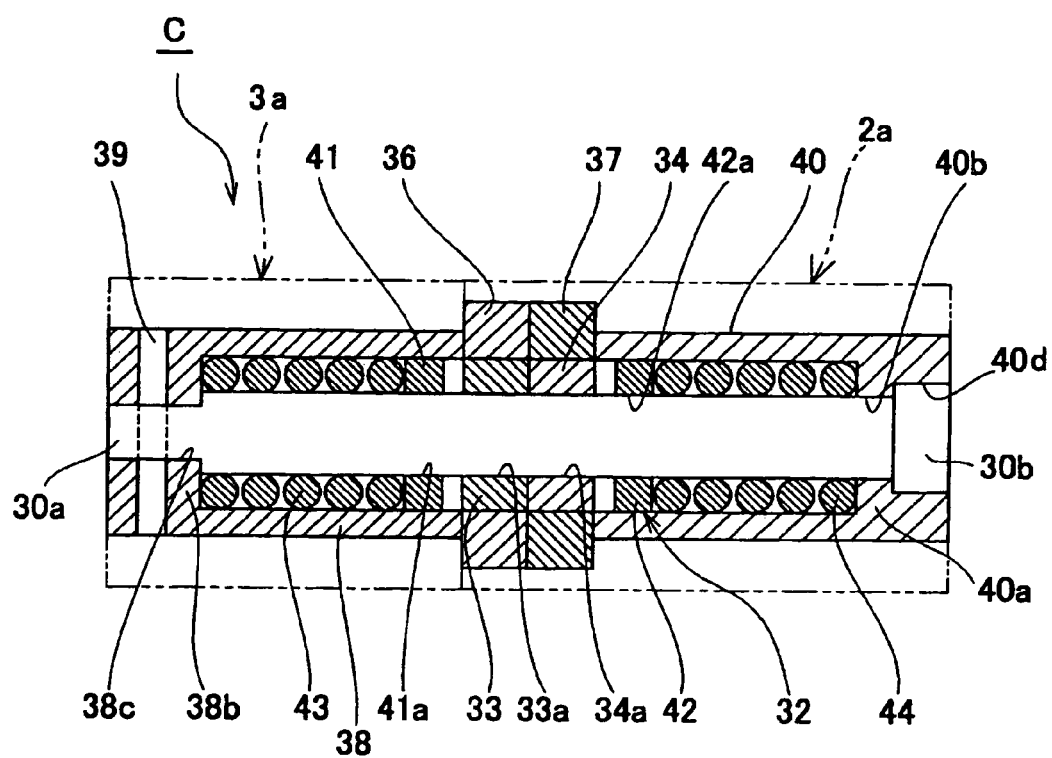
FIG. 31 is a vertical cross section to explain operation of the hinge device shown in FIG. 27.
Figure 32:
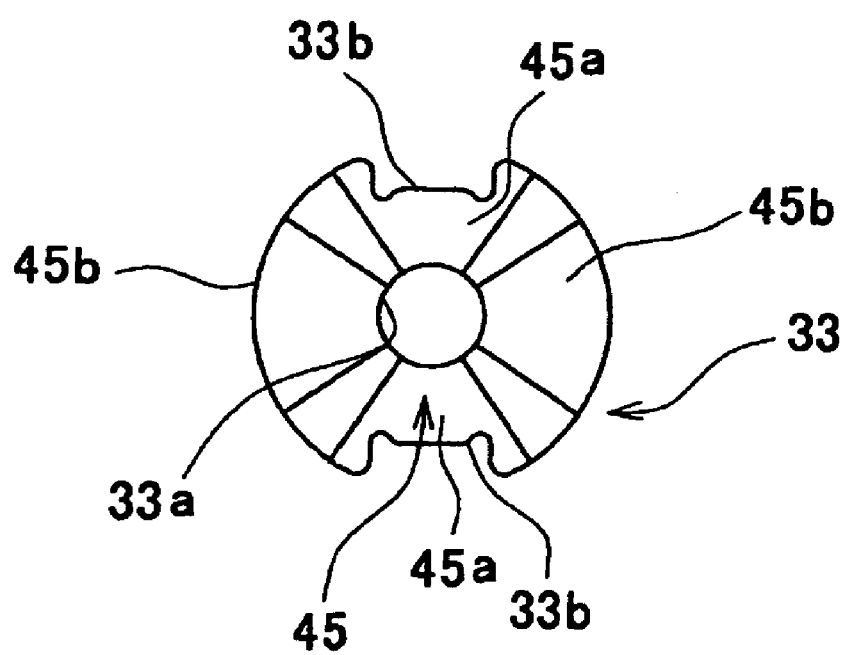
FIG. 32 is a right side view of a first fixing cam of the hinge device shown in FIG. 27.
Figure 33:
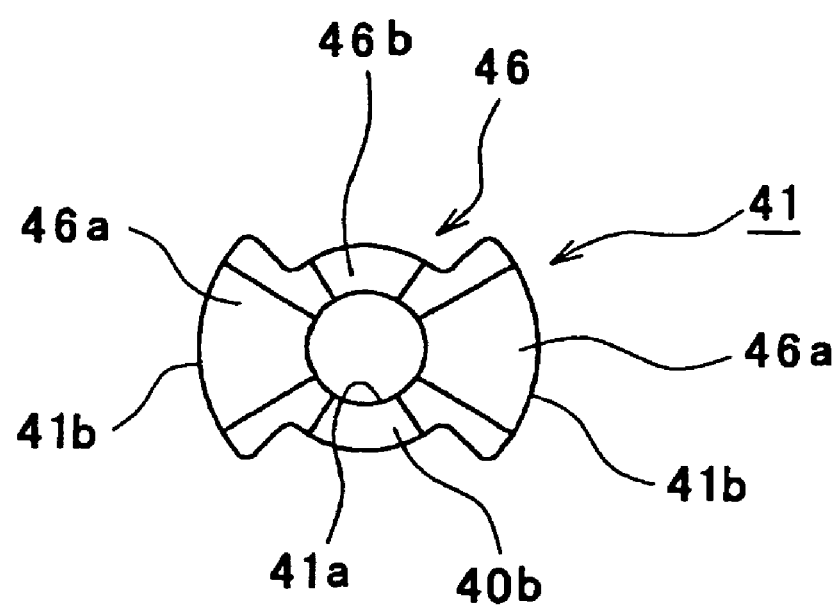
FIG. 33 is a left side view of the first slider cam of the hinge device shown in FIG. 27.
Figure 34:
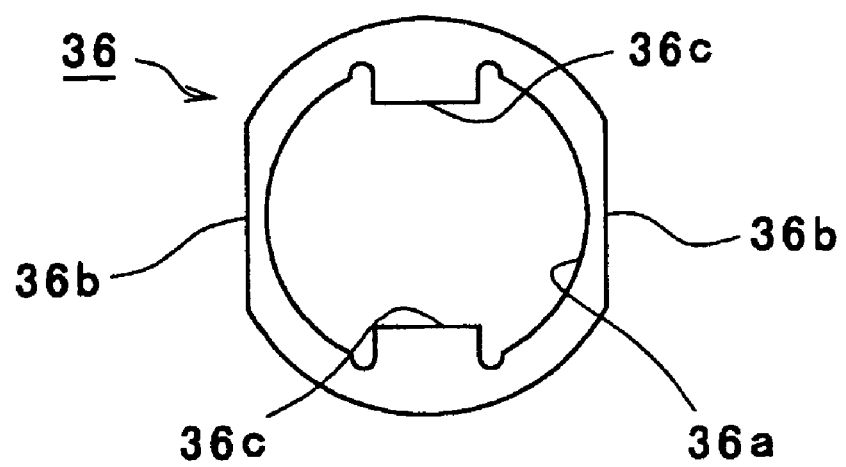
FIG. 34 is a side view of a first cam guide shown in FIG. 27.
Figure 35:
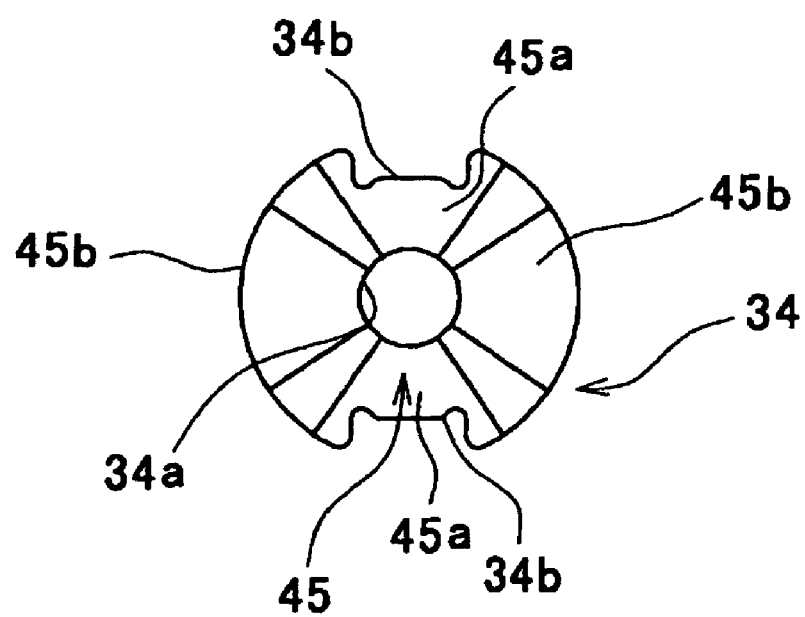
FIG. 35 is a left side view of a second fixing cam of the hinge device shown in FIG. 27.
Figure 36:
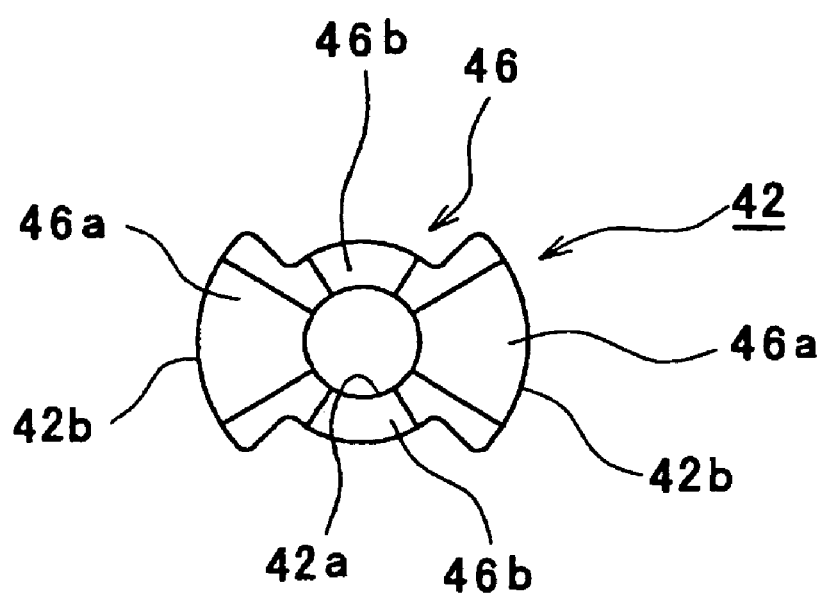
FIG. 36 is a right side view of the second slider cam of the hinge device shown in FIG. 27.
Figure 37:
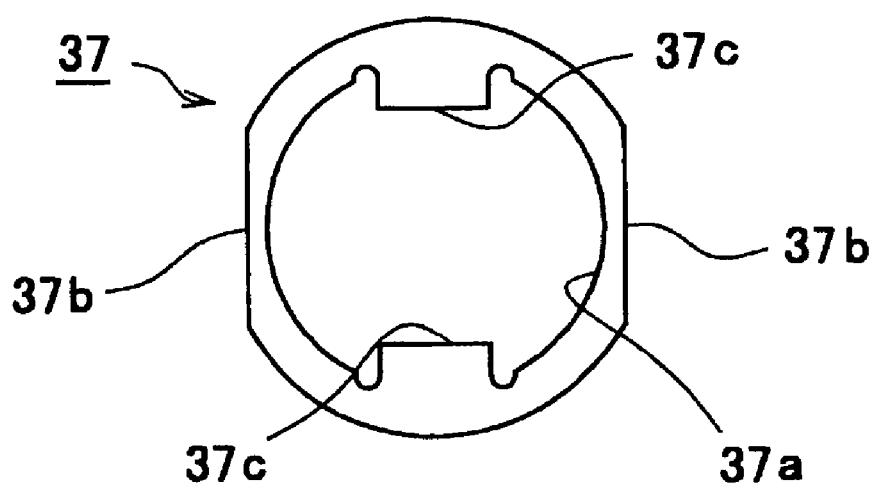
FIG. 37 is a side view of a second cam guide shown in FIG. 27.

Accordingly, as shown in FIG. 27, FIG. 28 and FIG. 30, by allowing the first cam case 38 to insert into and lock at the deformed attachment hole 3b provided on the second attachment portion 3a of the display device 3, being the second member, and by allowing the second cam case 40 and the first and second cam guides 36, 37 to insert into and lock at the deformed attachment hole 2b provided on the first attachment portion 2a of the keyboard main body 2, being the first member, the assembling is completed.

When the display device 3 is opened and closed with the regard to the keyboard main body, the first cam case 38 rotates together with the shaft 30 and the first slider cam 41, and the second cam case 40 rotates together with the shaft 30 and the second slider cam 42. Then, since respective first and second convex portions 45a and 46a of respective first and second cam portions 45 and 46 in the closed state of the display device 3 are separated from first and second concave portions 45b and 46b of respective first and second fixing cam 34 and rotate in a pressure contact state with respective flat first and second convex portions 45a and 46a of respective first and second cam portions 45 and 46 in respective first and second fixing cam 33 and 34, friction torque is generated, respective first and second slider cam 41 and 42 can stably suspend the display device 3 especially at an open angle about 100° which is its usage angle. It is of course possible here to open the display device to 180° with regard to the keyboard main body 2. It is possible to select the friction torque at that time at will by arbitrary selecting the shapes of respective first and second cam portions 45 and 46.

When the display device 3 is closed with regard to the keyboard main body 2, at just before its closed position (for instance about 10°), since respective first and second convex portions 45a and 46a of respective first and second cam portions 45 and 46 in the first and second slider cams 41 and 42 are forced to rotate in the closed direction when they slide down into respective first and second concave portions 45b and 46b of respective first and second cam portions 45 and 46 in respective first and second fixing cam 33 and 34, the display device 3 is closed as if being inhaled naturally even taking the hand off. And in this closed state, the display device 3 is locked to prevent itself from opening naturally after closed.

It should be noted that, as another embodiment, the cam case 6 and the cam case 38 can be attached to the attachment portion 2a on the keyboard main body 2 side, being the first member, and each of the rotation arresting means provided on the outside and inside of the cam cases 6, 38, on the outside of the friction case 16, and respective outsides of the fixing cam 10, the slider cams 8, 13, and the cam guides 12, 36 and 37 is not limited to the above-described embodiments. It is also acceptable to be structured that the flange portion of the shaft is provided in the opposite direction from that in the above-described embodiments so that the cam cases 6 and 38 are locked with E rings. Further, the shapes of deformed portions, deformed attachment portions, and deformed through holes of respective shafts of the fixing cams and the fixing members are not limited to those in the embodiments, they can be formed in various well-known shapes. As for materials used in the shaft, respective cases, the fixing cams, the fixing members and slider cams are not limited to that in the embodiment, material such as SUS, POM, and the like can be used as necessary, though for materials for the shafts, the fixing cams, and the slider cams, it is desirable to use hard material made of metal because strength and abrasion resistance are required.

What is claimed is:

1. A hinge device connecting a first attachment portion of a first member constituting a keyboard main body and a second attachment portion of a second member constituting a display device, so that said first member and said second member is opened and closed relatively to each other, said first attachment portion of said first member having a first deformed attachment hole;

said second attachment portion of said second member having a second deformed attachment hole in common with a central axial direction of said first deformed attachment hole;

said hinge device comprising:

a first cam case fixedly inserted in said second deformed attachment hole of said second member;

a second cam case rotatable inserted in said first deformed attachment hole of said first member;

a shaft arresting and penetrating through both of said first cam case and said second cam case in axial direction, and said first cam case and said second cam case fixedly attached to said shaft so as to rotate with said shaft;

a pair of first slider cam and a second slider cam rotatable mounted on said shaft, having first cam portion and second cam portion each composed of a convex portions and concave portions provided on each one side, being restrained its rotation by said first cam case and second cam case;

a pair of first cam guide and a second cam guide are fixedly inserted in said second deformed attachment hole of said second cam case, said first and second cam guides each having a first deformed attachment hole and a second attachment hole;

a pair of a first fixing cam and a second fixing cam fixedly inserted in said first deformed attachment hole and said second deformed attachment hole of said first cam guide and said second cam guide at a positions confronting to said first slider cam and said second slider cam, each having cam portions disposed with a convex portions and concave portions at a positions opposite to that of said first cam portion and said second cam portion of said first slider cam and said second slider cam, and an first elastic means and a second elastic means each wound around said shaft and provided inside said first cam case and said second cam case for forcing said first slider cam and said second slider cam slidably toward said first fixing cam and said second fixing cam.

2. The hinge device according to claim 1, wherein at least one portion of each cam portions provided on the fixing cam and the slider cam is formed in a plane portion so that friction torque is generated.

\* \* \* \* \*